Nov. 25, 1969    H. A. RASCHKE    3,480,319

ANTIFOULING SAFETY GATE FOR A HOISTING HOOK

Filed July 17, 1967

INVENTOR.
HERBERT A. RASCHKE

BY Townsend and Townsend

ATTORNEYS

United States Patent Office 3,480,319
Patented Nov. 25, 1969

3,480,319
ANTIFOULING SAFETY GATE FOR
A HOISTING HOOK
Herbert A. Raschke, Greenbrae, Calif., assignor to E. D.
Bullard Company, Sausalito, Calif.
Filed July 17, 1967, Ser. No. 653,720
Int. Cl. B66c *1/36, 1/40*
U.S. Cl. 294—82                                   3 Claims

ABSTRACT OF THE DISCLOSURE

A safety gate for a lifting hook which gate includes projections of sufficient width to prevent the hook from being aligned so that the gate acts as the bearing surface for supporting the weight of a cargo load.

---

This invention relates to an improved safety gate for use with a hook commonly attached to the cargo bail employed with heavy loads. More particularly this invention is directed to an antifouling safety gate useful in combination for preventing misalignment of a lifting hook with respect to a cargo bail.

Various forms and types of heavy duty lifting hooks have long been employed for hoisting or general handling of heavy loads. More recently, throat-closing elements have been incorporated with such hooks as a safety feature to retain the hoisting sling, cable or bail in the throat of the hook, thereby preventing unintentional release of the load from the hook. When attached to a standard cargo bail, the lifting hook occasionally becomes aligned so that the narrow throat-closing element or gate occupies the opening defined by the bail. Thus, the safety gate, rather than the main body of the hook, becomes the load-bearing surface. This is undesirable as a safety gate of this type is usually of insufficient strength to sustain the weight of the load.

Therefore, it is a principal object of the invention to provide a safety hook gate, for use with a cargo bail, that cannot be positioned so that the weight of the load, to which the bail is affixed, will be borne by the safety gate.

It is a feature and advantage of this invention to provide in a gate for a lifting hook at least one broad, readily usable surface for receiving indicia such as load capacity, part number and the like.

These objects, features and advantages of the invention will be better understood and others will become apparent when reference is made to the following detailed disclosure, especially in view of the attached drawing wherein.

Figure 1:
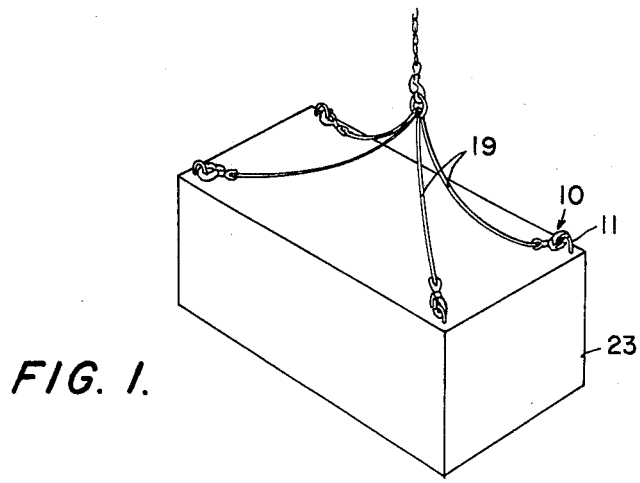
FIG. 1 is a schematic view illustrating the use of the antifouling hook of this invention.

Referring more particularly to the drawing, wherein the instant antifouling device is illustrated as part of the safety hook disclosed in U.S. Patent No. 2,728,967, issued Jan. 3, 1956, reference numeral 10 generally indicates a heavy-duty lifting hook of the type widely used for engaging and hoisting loads through attachment to a cargo bail or stationary eye 11. The bail has a fixed internal dimension. It will be apparent to one skilled in this art that hook 10 may be made of any suitable material such as metal and take any configuration or shape conventionally employed.

Hook 10 includes a curved portion 12 that terminates in a pointed end 14. Extending from the other end of hook 10 and formed integral therewith is shank 16 having an exteriorly-threaded portion 17. Positioned over threaded portion 17 is an eye or bail 18 for permitting attachment of hook 10 to a hoisting line 19 (see FIG. 1). A suitable securing element, such as nut 20, is arranged in threaded engagement with the threaded portion 17 of shank 16 for maintaining the parts in their assembled relation. Hook 10 is shaped to define a throat 22 that is adapted to receive therein bail 11 attached to load 23.

Safety gate (or arm) 24 formed of a metal of suitable strength is provided for preventing hook 10 from becoming accidentally disengaged from bail 11. Safety gate 24 includes an upper portion 25 and a lower portion 26. The end of the gate 24 is provided with a recess or cutout 28 for receiving the pointed end 14 of hook 10 when safety gate 24 is in bridging or closing relation with respect to throat 22. The upper portion 25 of safety gate 24 terminates in a bore (not shown), through which shank 16 is inserted for the positioning thereover of bail 18 and nut 20. Additional details of the construction of hook 10 and safety gate 24 are found in U.S. Patent No. 2,728,-967, supra.

Figures 2, 3:
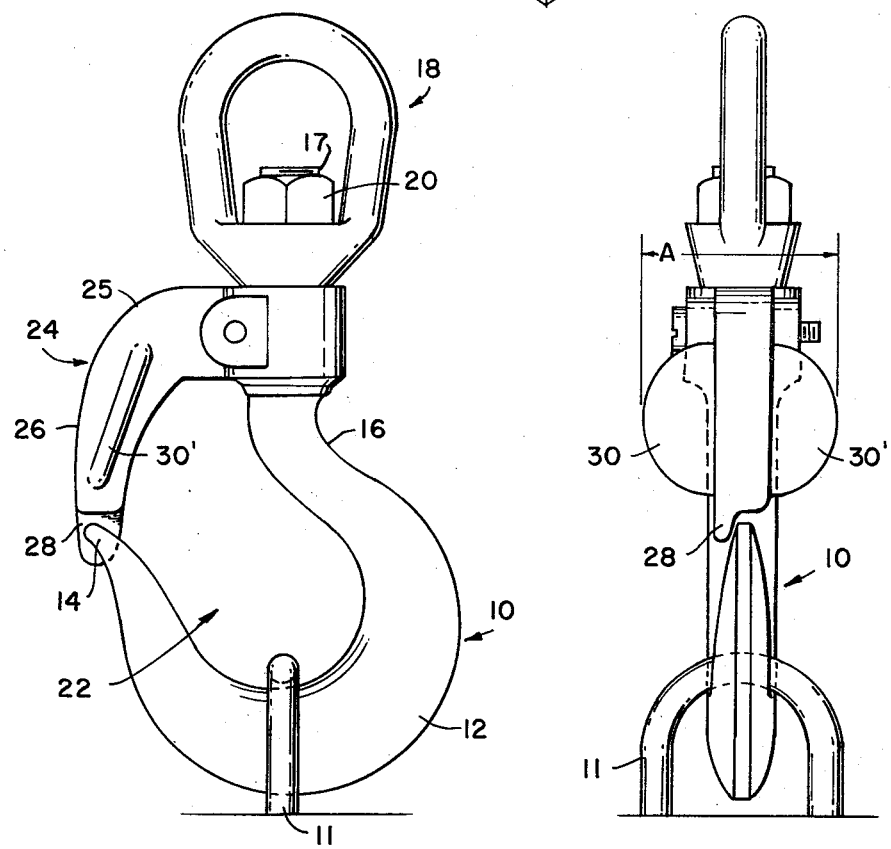
FIG. 2 is a side elevation of one embodiment of an antifouling hook constructed in accordance with this invention.
FIG. 3 is an end elevation of the antifouling hook shown in FIG. 2.

The instant invention resides in the addition of lugs 30 and 30' to safety arm 24. Lugs 30 and 30' are illustrated as having a disc-shaped semicircular configuration and spaced on opposite surfaces, i.e., approximately 180° apart on safety arm 24. As shown most clearly in FIG. 3, lugs 30 and 30' define in combination with lower gate portion 26, a width "A" that is greater than the internal width of bail 11. Thus, lugs 30 and 30' prevent hook member 10 from being aligned so that safety gate 24 acts as the bearing surface for bail 11. Conversely, hook 10 will, of necessity, always be positioned so that throat 22 is disposed within bail 11. As a result, undesirable stress on safety arm 24 through application of an excessive weight thereto is avoided. In this manner, lugs 30 and 30' prevent hook 10 from becoming "fouled." In addition, when lugs 30 and 30' are shaped as illustrated in FIGS. 2 and 3, an ample flat surface area is provided for the inclusion of information useful to the user of the safety hook.

Turning now to FIG. 1, a plurality of safety hooks 10, including antifouling safety arms, is shown attached through bails or stationary eyes 11 secured to load 23. In this manner, hooks 10 are incapable of being disposed so that any of the gates become the bearing surface for supporting the weight of load 23.

It will be apparent to one skilled in this art that lugs 30 and 30' can take any desired shape provided that they define a combined width that is greater than the width of the internal opening presented by the bail or loop 11. Thus, a single lug or enlargement of safety gate 24 can also be employed to create this antifouling characteristic. In addition, the antifouling lugs can be attached or secured to gate 24 in any conventional manner. However, it is preferable that the lugs be formed integral with the safety gate in a single casting or forging operation.

In one antifouling hook gate designed according to the present invention, the overall width "A" across the extremities of lugs 30 and 30' is 2¾ inches. Such hook finds wide utility in hoisting applications.

What is claimed is:

1. In combination: a cargo bail having an internal opening of pre-determined width that is attached to and utilized for handling loads and a lifting hook including a safety gate adapted to cooperate with the outer end of the hook for bridging the throat of said hook, said safety gate being rotatable upon an axis lying within the plane defined by said lifting hook and having a pair of integral projections extending on opposite sides of said gate that define a width in combination with said gate in excess of said predetermined width to prohibit alignment of said gate within said bail, so that said gate is prevented from becoming the load-bearing surface for said load.

2. A combination in accordance with claim 1 wherein said pair of projections are of disc-shaped semicircular configuration and are spaced 180° apart on said gate.

3. A combination in accordance with claim 1 wherein at least one of said pair of projections defines a flat surface especially suitable for the inclusion of indicia.

References Cited

UNITED STATES PATENTS 3,194,598   7/1965   Goldfuss _____ 294—78

FOREIGN PATENTS 1,032,584   6/1966   Great Britain.

HARVEY C. HORNSBY, Primary Examiner

U.S. Cl. X.R.

24—230.5